(12) United States Patent
Aleshin et al.

(10) Patent No.: US 11,742,098 B2
(45) Date of Patent: Aug. 29, 2023

(54) NUCLEAR REACTOR CORE SUPPORT SYSTEM PROVIDING RADIAL AND AXIAL SUPPORT

(71) Applicant: Westinghouse Electric Company LLC, Cranberry Township, PA (US)

(72) Inventors: Yuriy Aleshin, Cayce, SC (US); Stuart Kellner, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 113 days.

(21) Appl. No.: 17/156,977

(22) Filed: Jan. 25, 2021

(65) Prior Publication Data

US 2022/0238241 A1   Jul. 28, 2022

(51) Int. Cl.
*G21C 5/10* (2006.01)
*G21C 5/08* (2006.01)
*G21C 11/06* (2006.01)
*G21C 7/28* (2006.01)
*G21C 15/257* (2006.01)

(52) U.S. Cl.
CPC ............. *G21C 5/10* (2013.01); *G21C 5/08* (2013.01); *G21C 7/28* (2013.01); *G21C 11/06* (2013.01); *G21C 15/257* (2013.01)

(58) Field of Classification Search
CPC . G21C 5/10; G21C 5/08; G21C 11/06; G21C 7/28
USPC ....................... 376/302, 303, 909
See application file for complete search history.

(56) References Cited

U.S. PATENT DOCUMENTS

| 3,248,299 A | 4/1966 | Junkermann et al. |
| 4,096,034 A | 6/1978 | James |
| 4,731,220 A * | 3/1988 | Kim ............... G21C 11/06 376/458 |
| 5,110,536 A | 5/1992 | Chevereau |
| 2007/0076836 A1* | 4/2007 | Fortier ............... G21C 5/10 376/294 |

FOREIGN PATENT DOCUMENTS

| GB | 874018 A | 8/1961 |
| GB | 920531 A | 3/1963 |

OTHER PUBLICATIONS

Conway, "Promising design options for the encapsulated nuclear heat source reactor", (2001). (Year: 2001).*
International Search Report and Written Opinion for International PCT Application No. PCT/US2022/070306, dated Oct. 6, 2022.

* cited by examiner

*Primary Examiner* — Jack W Keith
*Assistant Examiner* — Daniel Wasil
(74) *Attorney, Agent, or Firm* — K&L Gates LLP (57) ABSTRACT

A nuclear reactor core mechanical support bracket is disclosed. The support bracket includes a housing, a spring disposed internally within the housing, a shaft slidingly disposed within the housing, a shaft travel pin, and a flange. The shaft is configured to engage the spring to compress and decompress the spring as the shaft travels in and out of the housing. The shaft travel pin controls the travel of the shaft. The flange is configured to mount the nuclear reactor core mechanical support bracket to a canister of a nuclear reactor. The shaft includes an inset configured to interface with a nuclear reactor core component.

10 Claims, 7 Drawing Sheets

NUCLEAR REACTOR CORE SUPPORT SYSTEM PROVIDING RADIAL AND AXIAL SUPPORT

STATEMENT REGARDING FEDERALLY SPONSORED RESEARCH OR DEVELOPMENT

This disclosure was made with government support under Contract DE-NE0008853 awarded by the Department of Energy. The government has certain rights in this disclosure.

FIELD

The present disclosure is generally related to nuclear power generation and, more particularly, is directed to an improved device configured to mechanically support a core of a nuclear reactor.

SUMMARY

The following summary is provided to facilitate an understanding of some of the innovative features unique to the aspects disclosed herein, and is not intended to be a full description. A full appreciation of the various aspects of the present disclosure can be gained by taking the entire specification, claims, and abstract as a whole.

In one aspect, the present disclosure provides a nuclear reactor core mechanical support bracket. The support bracket comprises a housing; a spring disposed internally within the housing; a shaft slidingly disposed within the housing and to engage the spring to compress and decompress the spring as the shaft travels in and out of the housing; a shaft travel pin to control the travel of the shaft; and a flange to mount the support bracket to a canister of a nuclear reactor. The shaft further comprises an inset configured to interface with a nuclear reactor core component.

In another aspect, the present disclosure provides a nuclear reactor. The nuclear reactor comprises a reactor core; a canister to contain and seal the reactor core within the canister; and a core mechanical support system configured to mount to the canister. The core mechanical support system comprises: a radial core mechanical support system to support the reactor core in a radial direction; and an axial core mechanical support system to support the reactor core in an axial direction.

In yet another aspect, the present disclosure provides a nuclear reactor. The nuclear reactor comprises: a reactor core; a canister to contain and seal the reactor core within the canister; and a core mechanical support system configured to mount to the canister; a radial reflector disposed within the canister; a support beam disposed between an inner wall of the canister and the radial reflector; a plate disposed on each end of the reactor core, wherein the axial core mechanical support system is configured to interface with the plate. The radial support bracket and the axial support bracket each comprises: a housing; a spring disposed internally within the housing; a shaft slidingly disposed within the housing and to engage the spring to compress and decompress the spring as the shaft travels in and out of the housing, the shaft further comprising an inset configured to interface with the support beam or the plate; a shaft travel pin to control the travel of the shaft; and a flange to mount the support bracket to the canister. The core mechanical support system comprises: a radial core mechanical support system to support the reactor core in a radial direction; and an axial core mechanical support system to support the reactor core in an axial direction. The support beam is disposed axially along the length of the reactor core. The radial core mechanical support system comprises a radial support bracket configured to interface with the support beam.

Further, it is understood that any one or more of the following-described forms, expressions of forms, examples, can be combined with any one or more of the other following-described forms, expressions of forms, and examples.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The examples set out herein illustrate various aspects of the claimed subject matter, in one form, and such examples are not to be construed as limiting the scope of the claimed subject matter in any manner.

DETAILED DESCRIPTION

Applicant of the present application owns the following U.S. Provisional Patent Applications, filed on the same date, the disclosure of each of which is herein incorporated by reference in its respective entirety:

U.S. patent application Ser. No. 17/080,241, titled ENHANCED GRAPHITE NEUTRON REFLECTOR WITH BERYLLIUM OXIDE INCLUSIONS, filed Oct. 26, 2020;

U.S. patent application Ser. No. 17/084,365, titled DEVICES, SYSTEMS, AND METHODS FOR ADJUSTING THE OUTPUT OF A REACTOR CORE, filed Oct. 29, 2020; and U.S. patent application Ser. No. 17/084,403, titled DEVICES, SYSTEMS, AND METHODS FOR CONFIGURING THE LAYOUT OF UNIT CELL OF A REACTOR CORE, filed Oct. 29, 2020.

Before explaining various aspects of a nuclear reactor comprising a core mechanical support system, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples, without limitation.

In various aspects, the present disclosure is directed to a nuclear reactor comprising a core mechanical support system to support the reactor core and maintain the reactor core in a predetermined position. In one aspect, the nuclear reactor is a solid state micro-reactor comprising an active core, a reflector, and the core mechanical support system. The reactor core provides nuclear, thermal, and mechanical interfaces to fuel, heat removal systems, shutdown systems, reactivity control systems, and instrumentation, for example, among others. The reactor core is located inside a pressure tight canister. The core mechanical support system is configured to mechanically support and maintain the reactor core, and corresponding components, in a predetermined position and configuration during all anticipated events including shipping and handling, operation, accident, and beyond design accident conditions, without limitation. In an effort to avoid over constraint and overstress of the reactor core components, the thermo-mechanical design of the core mechanical support system may accommodate various static and dynamic loading, differential thermal expansion and changes in core component geometry during irradiation (swelling, shrinking, etc.).

Figure 1:
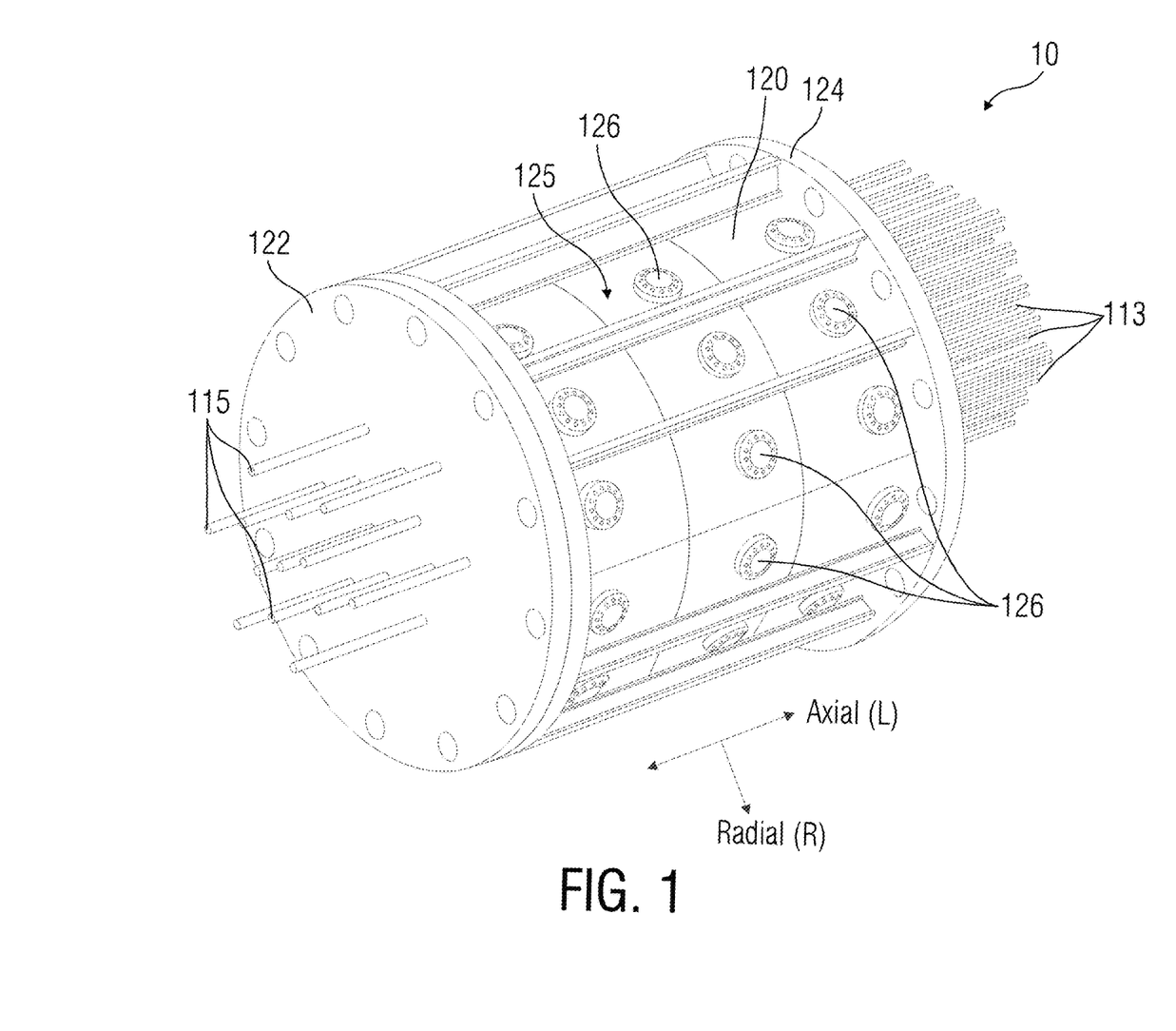
FIG. 1 is a perspective view of a nuclear reactor comprising a core mechanical support system, in accordance with at least one non-limiting aspect of the present disclosure.

Turning now to the figures, FIG. 1 is a perspective view of a nuclear reactor 10 comprising a core mechanical support system, in accordance with at least one non-limiting aspect of the present disclosure. In one aspect, the nuclear reactor 10 is a solid state micro-reactor. The nuclear reactor 10 comprises a core 100 (FIGS. 2-4 and 7), a reflector 106 (FIGS. 2-4 and 7), and a core mechanical support system contained within a pressurized canister 120. Front and rear canister closure bulkheads 122, 124 mechanically seal the core 100, reflector 106, and other components inside the canister 120.

Figure 2:
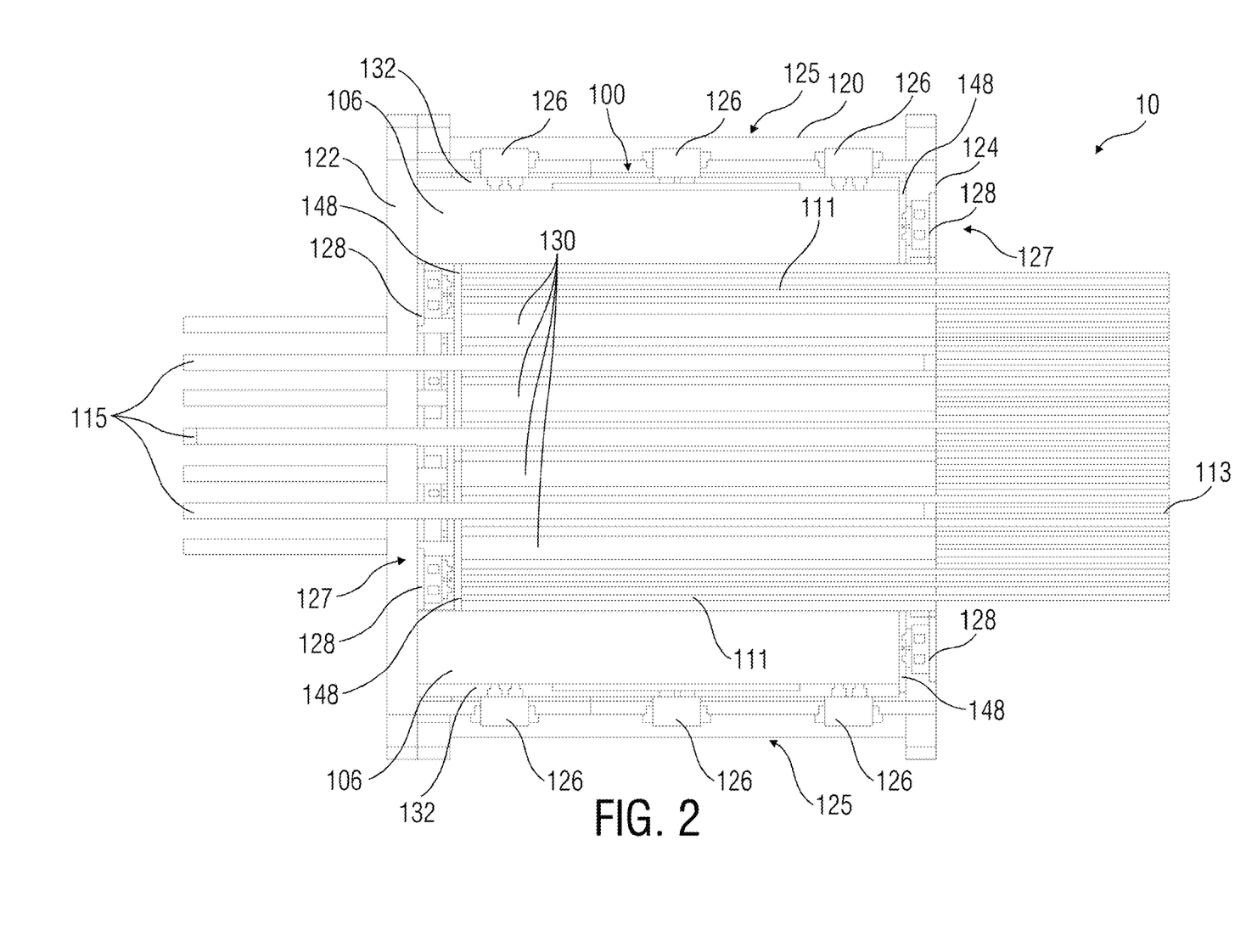
FIG. 2 is a longitudinal sectional view of the nuclear reactor shown in FIG. 1, in accordance with at least one non-limiting aspect of the present disclosure.

FIG. 2 is a longitudinal sectional view of the nuclear reactor 10 shown in FIG. 1, in accordance with at least one non-limiting aspect of the present disclosure. With reference to FIGS. 1 and 2, the reactor core 100 is contained within the canister 120. The core 100 comprises a plurality of reactivity control cells 104 configured to accommodate a plurality of reactivity control rods 115. Shut down rods can collectively work to control the fission occurring within the core 100 and therefore, prevent the core 100 from achieving a critical temperature in the event of a reactor 10 power failure and/or criticality accident. According to various non-limiting aspects, the amount of fission can be reduced or completely eliminated within the core 100, the latter of which can shut down the core 100. The reactivity control rods 115 contemplated by the present disclosure can include a neutron absorbing material and be configured to be inserted into the reactivity control cells 104 to slow and/or stop the nuclear reactions in the case of an emergency. The reactivity control configuration of the core 100 represents a feature of modern micro-reactors, which are transportable and have a broader range of commercial applications. Accordingly, the emergence of micro-reactors can increase the prevalence of nuclear technology and the risk of any significant adverse events from the increase can be minimized.

The core 100 comprises a graphite core block 130 and a radial reflector 106 that surrounds the graphite core block 130, among other components described herein. According to the non-limiting aspect of FIG. 2, the reflector 106 can include stationary and movable parts. The movable parts could be a control drum including a reflector material (e.g., Beryllium Oxide [BeO]) and a sector of absorber material (e.g., Boron Carbide [B4C]). The drum acts as a reflector or as an absorber depending on its rotation relative to the graphite core block. In one aspect, the reflector 106 includes one or more plates composed of a thick, neutron moderating material configured to substantially surround the graphite core block 130. The core 100 provides nuclear, thermal, and mechanical interfaces to fuel, heat removal system, shutdown and reactivity control systems, instrumentation, etc. The core 100 is located inside the pressure tight canister 120 and is surrounded by the reflector 106. The core 100 and corresponding components are mechanically supported by the mechanical support system during all anticipated conditions including shipping and handling, operation, accident and beyond design accident conditions.

A core mechanical support system comprising a radial support system 125 and an axial support system 127 supports and maintains the core 100 in a predetermined position and configuration during a variety of anticipated events including shipping and handling, operation, accident, and beyond design accident conditions, without limitation. In an effort to avoid over constraint and overstress of the reactor core 100 and associated components, the thermo-mechanical design of the core mechanical support system may accommodate various static and dynamic loading, differential thermal expansion and changes in core component geometry during irradiation (swelling, shrinking, etc.). The core support system separates (as practically as possible) support for axial and radial direction of the cylindrical core 100 located horizontally. In this aspect, the dimensional changes of the core 100 components in the radial direction do not significantly affect the reaction forces in the axial direction and vice versa.

The radial support system 125 comprises a number of radial support brackets 126 surrounding the core 100 and the axial support system 127 comprises a number of axial support brackets 128 located at both ends of the core 100. The radial support brackets 126 and the axial support brackets 128 support and maintain the core 100 in a predetermined radial and axial position during shipping and handling, operation, accident and beyond design accident conditions. The radial support brackets 126 interface with support beams 132, which engage the radial reflector 106, to uniformly distribute the load of the core 100, as discussed in more detail hereinbelow. The support beams 132 are disposed between an inner wall of the canister 120 and the reflector 106. The support beams 132 are disposed axially along the length of the core 100. The axial supports brackets 128 interface with plates 148 to uniformly distribute the load of the core 100, as discussed in more detail hereinbelow.

Figure 5:
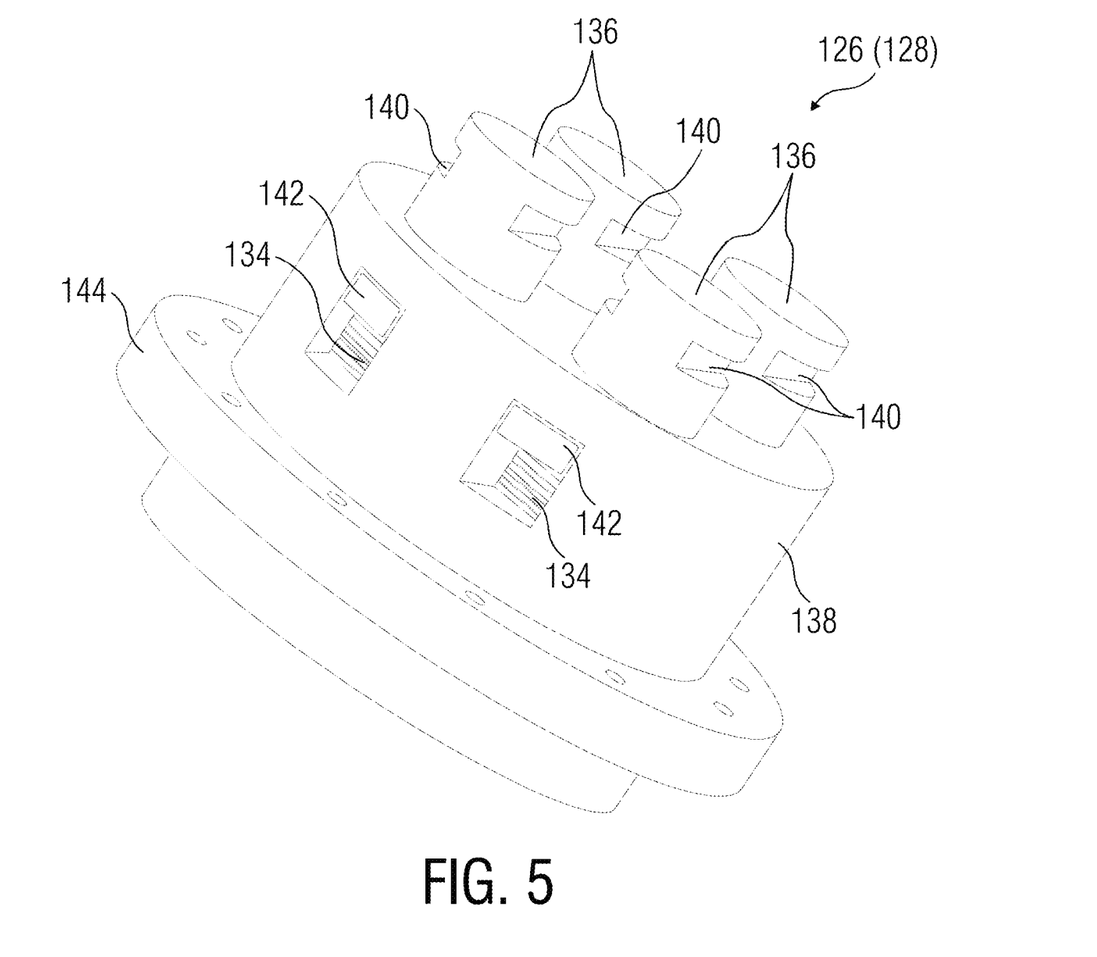
FIG. 5 is a perspective view of a radial and axial support bracket, in accordance with at least one non-limiting aspect of the present disclosure.
Figure 6:
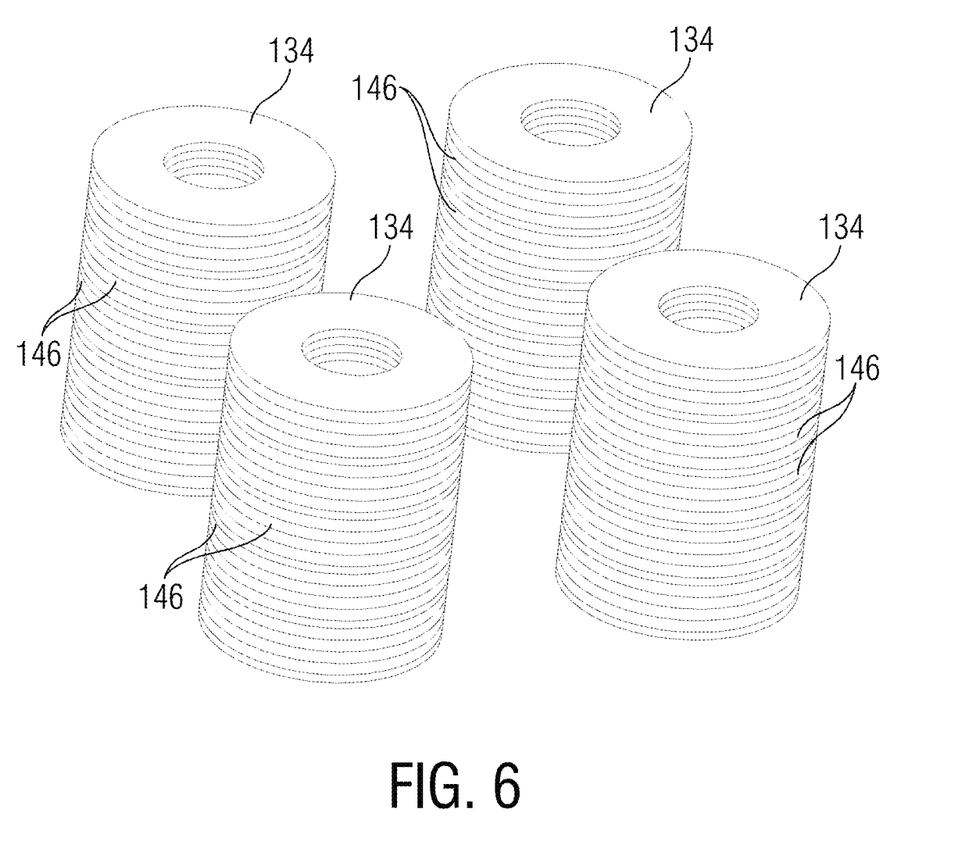
FIG. 6 is a perspective view of Belleville washer springs, in accordance with at least one non-limiting aspect of the present disclosure.

With reference now also to FIGS. 5 and 6, each radial/axial support bracket 126, 128 comprises at least one spring 134 that is compressed by a shaft 136 that travels in and out of the radial/axial support bracket 126, 128 housing 138. The radial/axial support bracket 126, 128 interface with the support beams 132 and/or plates 148 at the connection inset 140 of the radial/axial support bracket 126, 128. In the illustrated aspect, each radial/axial support bracket 126, 128 comprises four springs 134 and each spring 134 comprises a number of washers 146.

Figure 3:
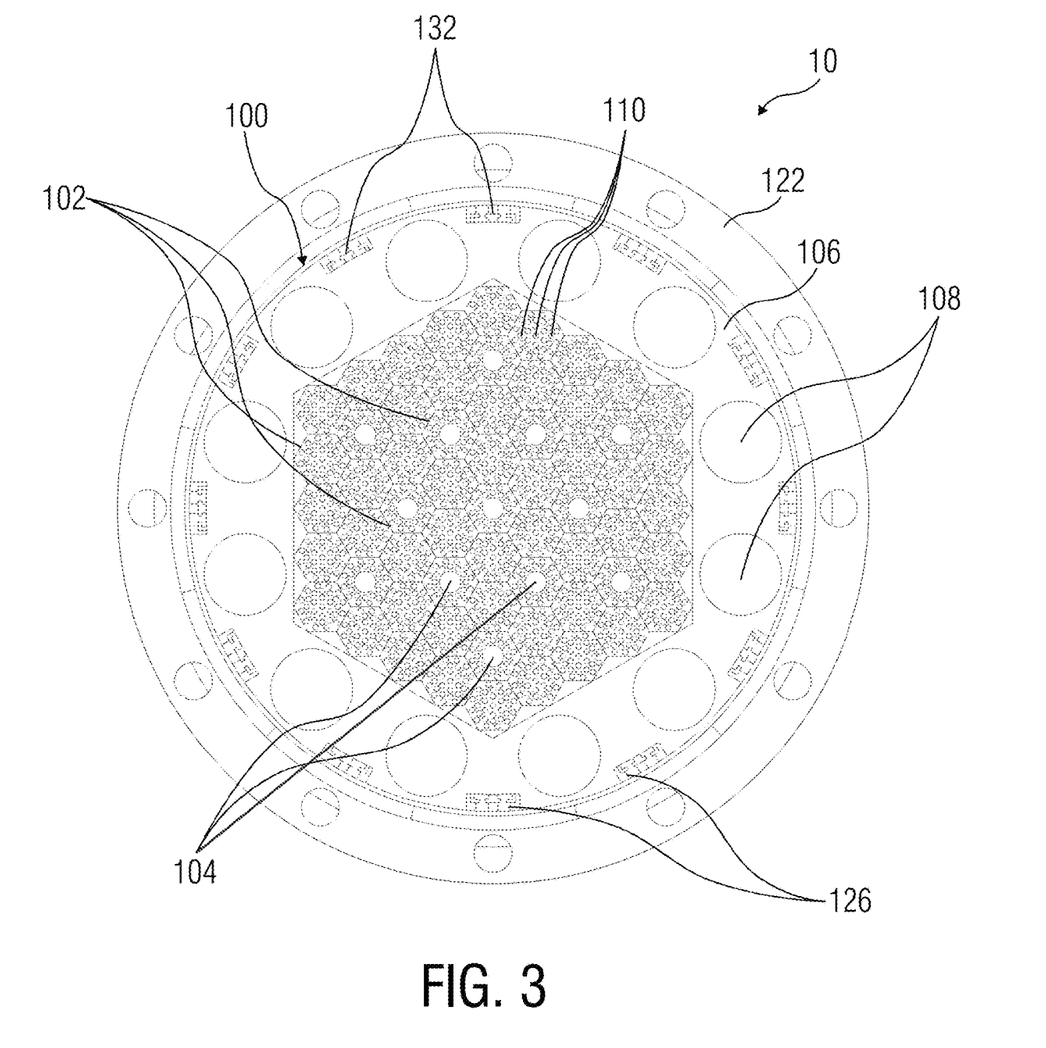
FIG. 3 is a cross sectional view of the nuclear reactor shown in FIGS. 1 and 2, in accordance with at least one non-limiting aspect of the present disclosure.
Figure 4:
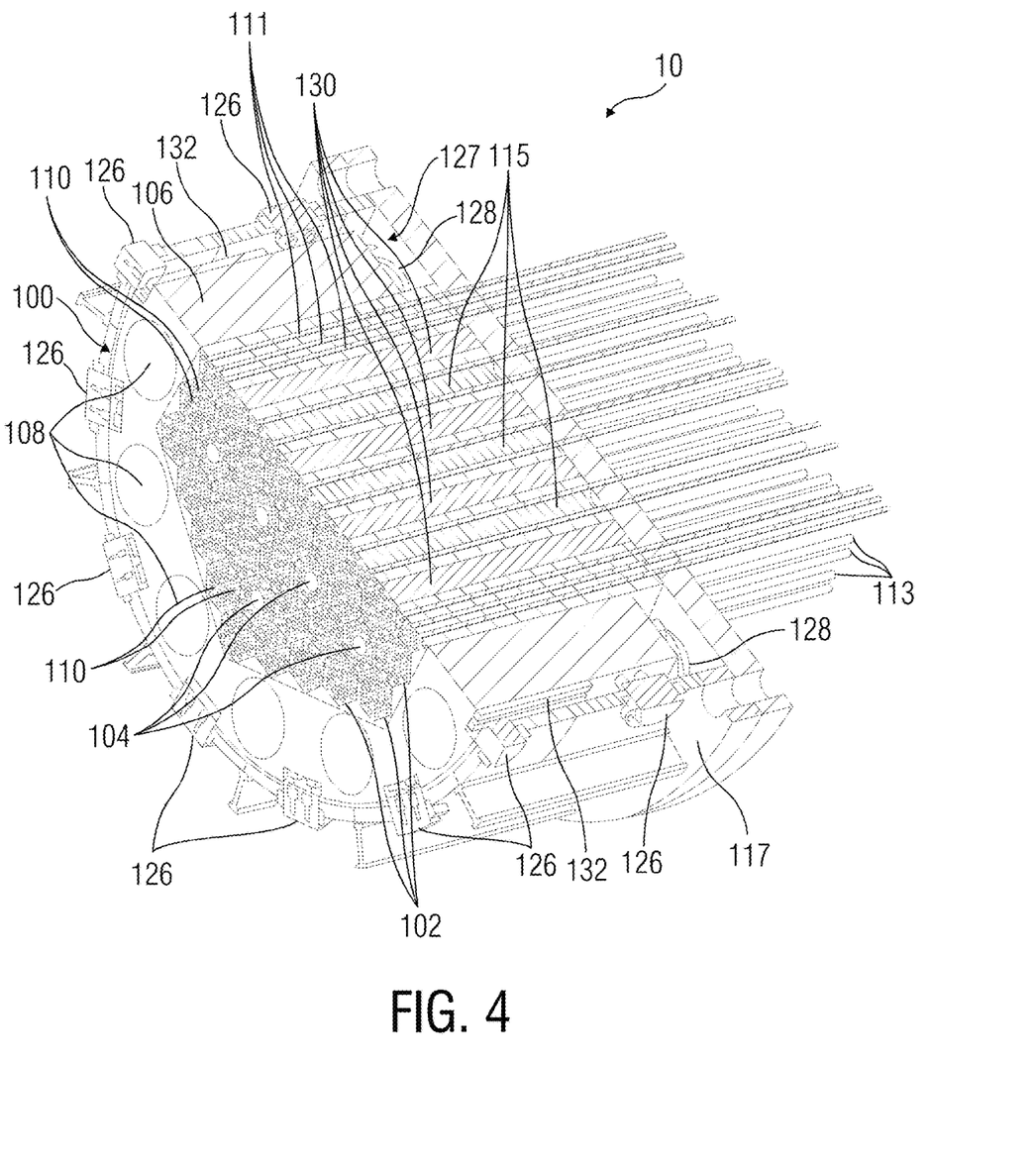
FIG. 4 is a perspective longitudinal and cross sectional view of the nuclear reactor shown in FIGS. 1-3, in accordance with at least one non-limiting aspect of the present disclosure.

FIG. 3 is a cross sectional view of the nuclear reactor 10 shown in FIGS. 1 and 2, in accordance with at least one non-limiting aspect of the present disclosure. FIG. 4 is a perspective longitudinal and cross sectional view of the nuclear reactor 10 shown in FIGS. 1-3, in accordance with at least one non-limiting aspect of the present disclosure. With reference now to FIGS. 1-4, according to one non-limiting aspect, the core 100 includes a plurality of unit cells 102, which collectively form hexagonal core boundaries. Each unit cell 102 can be configured to accommodate a heat pipe 113 and an amount of fuel (e.g. in the form of a rod 111 and/or stack configuration), which can collectively generate nuclear power and manage thermal energy throughout the core 100. According to some non-limiting aspects, one or more unit cells 102 can further include a moderator configuration, which can slow down neutrons emitted from the fuel. The unit cells 102 can be arranged such that the core 100 includes a hexagonal geometry. However, in other non-limiting aspects, the unit cells 102 can be arranged such that the core 100 may include any of a number of different geometrical configurations, depending on intended application and/or user preference.

With reference to FIGS. 3 and 4, the reflector 106 can further include a plurality of control drums 108 configured to house a neutron absorptive and reflective materials. In the event of a reactor and/or power failure, the control drums 108 can turn inward towards the core 100 such that the absorptive material can shut down the reactor. According to some non-limiting aspects, the reflector 106 can additionally include a gamma shield configured to provide gamma and neutron shielding. The reflector can be configured to substantially surround the neutron shield, the core 100, and its internal components 102, 104, 111, 113, 115 to further mitigate radiation. As depicted in the non-limiting aspect of FIGS. 3 and 4, the reflector 106 can be arranged in a circular configuration that surrounds the hexagonally arranged plurality of unit cells 102. However, in other non-limiting aspects, the reflector 106 can be arranged to form any of a number of different geometrical configurations about the plurality of unit cells 102, depending on intended application and/or user preference.

Still referring to FIGS. 3 and 4, the reflector 106 can be sectioned to ensure that a gap exists between the unit cells 102 and the reflector 106 as a means of controlling and promoting a desired amount of heat transfer. For example, the reflector 106 can be formed from a plurality of modular plates integrated to create the aforementioned gap. In other non-limiting aspects, however, the reflector 106 can be integrally formed. Additionally, the reflector 106 can be further configured to extend along an axial direction, which defines a length of the core 100. The plurality of unit cells 102 can also be configured to span the length of the core 100.

Some compact reactors function as a "nuclear battery" which uses energy from the fission of nuclear materials (e.g. uranium in an oxide, metallic and/or silicide form, amongst others) to generate electricity. Since the unit cells are configured to accommodate fuel, in any form, including such radioactive isotopes, the magnitude of the length L of the core 100 can correspond to a desired output of the nuclear reactor and the fuel mass necessary to maintain criticality. Additionally and/or alternatively, the increased versatility of micro-reactors mean the core 100 must be configurable for a wide variety of applications, many of which might have size and/or weight constraints. Therefore, the design of core 100 allows for the length L to be specifically configurable to accommodate for the output, size, and/or weight requirements of the nuclear reactor.

Still with reference to FIGS. 3 and 4, the plurality of unit cells 102 and the plurality of reactivity control cells 104 can be particularly arranged to establish the hexagonal configuration of the non-limiting aspect of the core 100. It is also evident that each unit cell 102 of the plurality of unit cells 102 and each reactivity control cell 104 of the plurality of reactivity control cells 104 include a hexagonal configuration as well. However, it shall be appreciated that the hexagonal configuration is exclusively depicted for illustrative purposes. Accordingly, the present disclosure contemplates other non-limiting aspects in which the unit cells 102 and reactivity control cells 104 include any number of geometrical configurations (e.g. square, circular, triangular, rectangular, pentagonal, octagonal) and arranged such that the core 100 can include any number of geometrical configurations.

In further reference of FIGS. 3 and 4, the plurality of unit cells 102 and the plurality of reactivity control cells 104 can be arranged along a radial direction, thereby defining a radial dimension of the core 100. Specifically, the core 100 shown in FIGS. 3 and 4 comprises 48 unit cells 102 and 13 reactivity control cells 104. The present disclosure, however, contemplates other non-limiting aspects wherein the core 100 may include any number of unit cells 102 and reactivity control cells 104. It will be appreciated that the ability to easily add or subtract the number of unit cells 102 or reactivity control cells 104 to the core 100 without dramatically altering its design allows the core 100 to be easily scaled depending on the intended application and/or user preference. As such, the output of the core 100 design can also be easily adjusted for a multitude of applications and requirements. For example, a user can change the radial and/or axial dimension of the core 100 by adding or subtracting unit cells 102 or reactivity control cells 104 to the core 100. Since the unit cells are configured to accommodate fuel including radioactive isotopes, increasing or decreasing the magnitude of the radial dimension can alter the output of the core 100. Accordingly, the radial dimension of the core 100 can correspond to a desired output of the nuclear reactor depending on the intended application and/or user preference. Additionally and/or alternatively, the radial dimension of the core 100 can be specifically configured to comply with a multitude of size and/or weight requirements, which can vary by application. Accordingly, the core mechanical support system can be modified by adding or removing radial/axial support brackets 126, 128 of the radial support system 125 and the axial support system 127 to accommodate changes in the radial and/or axial dimensions of the core 100.

It shall be appreciated that the term "radial", as used in the present disclosure, describes any direction extending from the center of the core 100 when viewed from the top. Accordingly, the use of the term "radial" shall not be limited to circular or circular-like configurations and shall not be construed to imply that the core 100 of FIGS. 1-4 is limited to circular, or circular-like, configurations. For example, the present disclosure contemplates non-limiting aspects in which the core 100 includes a rectangular cross-section configuration. According to such aspects, the core 100 can include one or more radial dimensions of varying lengths. With reference to FIGS. 2 and 4, the plurality of unit cells 102 and the plurality of reactivity control cells 104 can be integrally formed from a solid block 130 of material (e.g. graphite). Thus, the internal features of each of the unit cells 102, such as heat pipe channels, fuel channels, moderator channels, and/or the like, can be bored out of—and integrally formed from—the solid block of material. However, according to other non-limiting aspects, each unit cell 102 of the plurality of unit cells 102 and each reactivity control cell 104 can be modularly formed and integrated into the core block 130 to promote the adjustability of the core 100 design.

Regardless, the core 100 can be easily manufactured to include any number of unit cells 102 and/or reactivity control cells 104. This can allow the core 100 design to be easily scalable, an obvious improvement over known reactors. For example, altering the number of unit cells 102 and reactivity control cells 104 allows the user to alter the radial dimension R and axial length L (FIG. 1) of the core 100, thereby altering its output and flexibility for applications with unique output and/or space constraints. The core 100 design, however, essentially remains the same, which allows for predictability in production and performance regardless of the difference in output and size. These features also reduce the amount of non-recurring engineering required to design for a new application and facilitates manufacturing consistency and the standardization of parts. Although the core 100 can be scaled as a means of adjusting its output, the scaling should further consider the power rating of the implemented heat pipes, the appropriate number of reactivity control rods required for the adjusted output, and the effectiveness of the control drums.

According to other non-limiting aspects, the unit cell 102 can further include a moderator channel configured to accommodate a moderator (e.g. a hydride-based moderator, BeO, etc.) of the core 100, wherein the moderator can be configured to retard and the propagation of neutrons emitted by fuel inserted in the plurality of fuel channels 110. Alternatively and/or additionally, the unit cell 102 can include additional features, configured to accommodate other instrumentation of the core 100.

Still referring to FIGS. 3 and 4, the unit cell 102 also can include features configured to accommodate a neutron absorbing materials that can slow the nuclear reactions occurring in the fuel channels 110 of the unit cells 102. Accordingly, the power distribution and radial power peaking of the unit cells 102—and consequentially, the core 100 itself—can be further adjusted via the influence of neutron absorbers. According to some non-limiting aspects, the core 100 can be designed for an application that does not impose a strict transportation requirement on the core 100. Alternatively and/or additionally, the core 100 can use a high-density fuel. According to such aspects, the axial power peaking factor and axial power distribution of the unit cells 102 and core 100 can be otherwise managed by varying the fuel enrichment level within the fuel channels 110 of the unit cells 102 or by adding burnable absorbers.

Similarly, the reflector 106 configuration may include a plurality of reflectors 106 including control drums 108, wherein the reflectors 106 are configured to extend along at least a portion of the length L of the core 100. Of course, according to some non-limiting aspects, the reflectors too can be integrally formed. Again, the reflectors can be specifically configured to create advantageous gaps to promote and enhance heat transfer throughout the core 100.

According to non-limiting aspects of FIGS. 1-4, the core 100 can be assembled to include a fuel 111 (e.g. rods and/or stacks), heat pipes 113, and reactivity control rods 115 dispositioned throughout the plurality of unit cells 102 and reactivity control cells 104. Specifically, the fuel 111 can be dispositioned throughout the fuel channels 110 of one or more unit cells 102, the heat pipes 113 can be dispositioned throughout the heat pipe channels 112 (FIG. 3) of one or more unit cells 102, and the reactivity control rods 115 can be dispositioned through a reactivity control channel (not shown) of one or more reactivity control cells 104. According to some non-limiting aspects, the fuel 111 and heat pipes 113 are configured to extend the predetermined length L of the core 100. In other non-limiting aspects, the fuel 111 and heat pipes 113 are configured to extend an additional length beyond the predetermined length L of the core, to facilitate downstream ex-core connections and/or equipment (e.g. power systems, condensers, structural supports). This design allows the core 100 to be customized for any intended application and/or user preference, which enables it to be versatile in response to customer needs. These alterations, however, can be evaluated using the underlying nuclear physics and/or manufacturability of the core 100 design, which preserves reliability and predictability in core 100 production and operation. In other words, the assembled core 100 allows the fuel 111 and heat pipes 113 to be specifically configured to accommodate for any specific power requirement and/or structural configuration without having to reinvent the basic core 100 design and assume the inherent development risks.

Still referring to FIGS. 1-4, the core 100 can further include a plurality of reactivity control rods 115 configured to be dispositioned through one or more reactivity control cell 104 of the plurality of reactivity control cells 104. For example, the reactivity control cells 104 can include a reactivity control rod or reactivity control channel similar to the fuel channels 110 and/or heat pipe channels 112, but specifically configured to accommodate a reactivity control rod 115. As previously discussed, each reactivity control rod 115 can include a neutron absorbing material configured to slow and/or stop the nuclear reactions within the core 100 in the case of an emergency. The reactivity control rods 115 can collectively work to prevent the core 100 from achieving a critical temperature or prompt criticality in the event of a reactor and/or power failure. Accordingly, the emergence of micro-reactor can increase the prevalence of nuclear technology, making safety a higher priority.

FIG. 5 is a perspective view of a radial and axial support bracket 126, 128, in accordance with at least one non-limiting aspect of the present disclosure. The main component of the core support system is a radial/axial support bracket 126, 128 comprising a preloaded spring block. Each spring block of the radial/axial support bracket 126, 128 comprises various number of springs 134 as shown in more detail in FIG. 6. Each radial/axial support bracket 126, 128 comprises a number of springs 134 located internal to the bracket housing 138. Each spring 134 is preloaded or compressed by a shaft 136 that is slidingly disposed within the bracket housing 138 and interfaces with a support beam 132 (FIGS. 2-4) at the connection inset 140. The shaft 136 is configured to engage the spring 134 to compress and decompress the spring 134 as the shaft 136 travels in and out of the bracket housing 138. The travel of each bracket shaft 136 is controlled by a shaft travel pin 142, which also prevents rotation of the bracket shaft 136. The radial/axial support bracket 126, 128 can be mounted to the external canister 120 (FIGS. 1, 2, 4) by the support bracket flange 144. A number of radial support brackets 126 are located around the core 100 (FIGS. 1-4) and a number of axial support brackets 128 are located at either end of the core 100 to create a desirable support for the core 100 in a radial and axial direction. The reaction forces corresponding to the preloaded spring block radial/axial support bracket 126, 128 act against internal walls of the pressure tight canister 120. In one aspect, the and the bracket body comprising the housing 138, bracket flange 144, shaft 136, and shaft travel pin 142 may be made of 304 stainless steel. The materials of construction can also be modified depending on environmental conditions.

FIG. 6 is a perspective view of Belleville washer springs 134, in accordance with at least one non-limiting aspect of the present disclosure. In one aspect, the spring in the preloaded spring block radial/axial support bracket 126, 128 may be a disc spring such as a Belleville washer spring 134, for example. The Belleville washer spring 134 may be made of high-strength, corrosion-resistant age-hardenable alloy such as nickel chromium material that can be readily fabricated into complex parts. In one aspect, the Belleville washer spring 134 is made of Alloy 718 material. With reference to FIGS. 5 and 6, the radial/axial support bracket 126, 128 should not be limited in the disclosed context as a variety of other configurations may be employed. Other aspects of the bracket housing 138 or body is configured to house the Belleville washer springs 134 in a compressed state via the shaft 136 with the shaft travel pin 142. The number of Belleville washer springs 134 and the number of Belleville washers 146 in the spring can vary. The Belleville washer 146 has frusto-conical shape that gives the washer 146 its characteristic spring. The dimensions of any individual component also can be varied. The materials of construction can also be modified depending on environmental conditions. In various aspects, The Belleville washer 146 is a type of spring shaped like a washer. The Belleville washer spring 134 may be referred to as a coned-disc spring, conical spring washer, disc spring, Belleville spring, or cupped spring washer, comprise a conical shell which can be loaded along its axis either statically or dynamically.

It will be appreciated that the number of radial/axial support brackets 126, 128 and preloaded spring 134 characteristics may be selected to ensure that the "as-built" preload force is in a range of forces corresponding from 1 g to 10 g acceleration. In one aspect, the deflection of the spring 134 pack is sufficient to compensate for a differential expansion between components of the core 100, canister 120, and the radial/axial core the support systems 125, 127 taking into account thermal expansion and irradiation induced geometry and dimensional changes.

Figure 7:
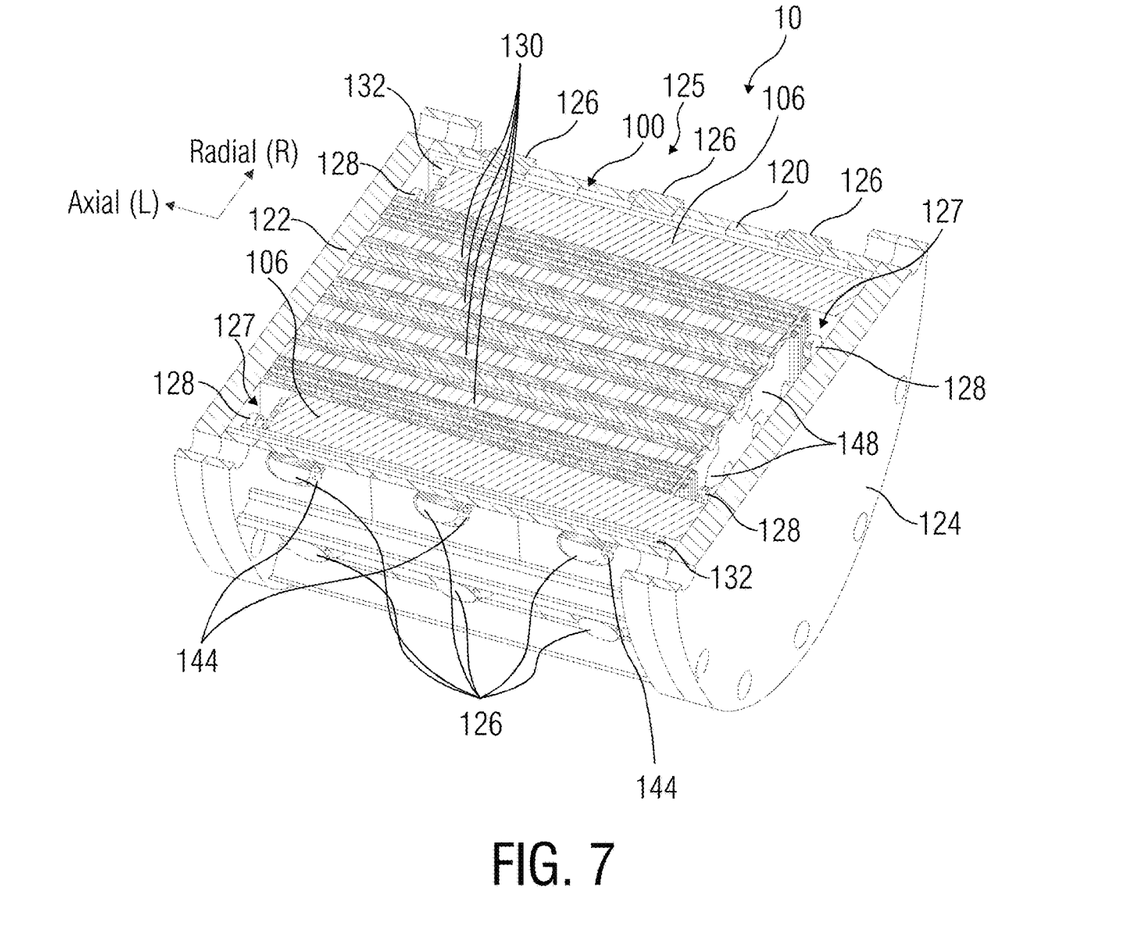
FIG. 7 is a perspective longitudinal sectional view of the nuclear reactor core shown in FIGS. 1-4, in accordance with at least one non-limiting aspect of the present disclosure.

FIG. 7 is a perspective longitudinal sectional view of the nuclear reactor core 100 shown in FIGS. 1-4, in accordance with at least one non-limiting aspect of the present disclosure. The reactor core 100 comprises a core mechanical support system comprising radial/axial core the support systems 125, 127 comprising radial/axial support brackets 126, 128 acting in axial (L) and radial (R) directions as described herein. In this configuration, the core 100 is assembled with graphite core blocks 130, fuel rods (not shown), heat pipes (not shown) and a stationary radial reflector 106 located inside the pressurized canister 120. The radial core support system 125 comprising a series of preloaded spring radial support brackets 126 interface with the core components using beams 132 to uniformly distribute the load radially. The axial core support system 127 comprising a series of preloaded spring axial support brackets 128 interface with plates 148 to uniformly distribute the load axially. The axial support brackets 128 can engage with the plates 148 via the shaft 136 and/or the inset 140.

With reference now to FIGS. 5-7, the radial core support system 125 comprises a series of the preloaded spring radial support brackets 126 which interface with the core 100 component using beams 132 to uniformly distribute the load. The radial support brackets 126 are located along the core 100 and uniformly distributed over the canister 120 wall in the axial and hoop direction. The radial support brackets 126 are attached to the canister 120 wall at one side by the flange 144. The other side of the radial support bracket 126 interfaces with the beam 132 located along the axial (L) length of the core 100 inside the canister 120. The beam 132 slidingly interfaces to the core 100 to allow a differential expansion between the graphite core block 130 components, the canister 120, and the radial support bracket 126 and spring 134 pack. The number and characteristic of the spring 134 pack located in the housing 138 of the radial bracket 126 is selected based on required preload, anticipated external load, and combined dimensional changes due to differential thermal expansion and irradiation induced effects in the radial direction.

Still with reference to FIGS. 5-7, the axial support brackets 128 are attached to the canister bulkhead 122, 124 and provides force to the core graphite block 130 over the plates 148. A sliding interface between the axial support bracket 128 and the plates 148 allow for a differential expansion between the core graphite block 130 and the canister 120. The number and characteristic of the spring 134 pack located in the housing 138 of the axial support bracket 128 is selected based on the required preload, anticipated external load and combined dimensional changes due to differential thermal expansion and irradiation induce effects in the axial direction.

Various aspects of the subject matter described herein are set out in the following numbered examples:

Example 1: A nuclear reactor core mechanical support bracket, comprising: a housing; a spring disposed internally within the housing; a shaft slidingly disposed within the housing and to engage the spring to compress and decompress the spring as the shaft travels in and out of the housing, the shaft further comprising an inset configured to interface with a nuclear reactor core component; a shaft travel pin to control the travel of the shaft; and a flange to mount the support bracket to a canister of a nuclear reactor.

Example 2: The nuclear reactor core mechanical support bracket of Example 1, wherein the inset is configured to connect to a support beam axially disposed along the length a nuclear reactor core.

Example 3. The nuclear reactor core mechanical support bracket of any one or more of Examples 1-2, wherein the inset is configured to connect to a plate disposed at either end of a nuclear reactor core.

Example 4. The nuclear reactor core mechanical support bracket of any one or more of Examples 1-3, wherein the spring is a disc spring comprising a disc washer spring.

Example 5. The nuclear reactor core mechanical support bracket of Example 4, comprising a plurality of disc springs, wherein each one of the plurality of disc springs comprises a plurality of stacked disc washer springs.

Example 6. The nuclear reactor core mechanical support bracket of any one of Examples 1-5, wherein the housing is made of stainless steel.

Example 7. The nuclear reactor core mechanical support bracket of any one or more of Examples 1-6, wherein the spring is made of Alloy 718.

Example 8. A nuclear reactor, comprising: a reactor core; a canister to contain and seal the reactor core within the canister; and a core mechanical support system configured to mount to the canister, wherein the core mechanical support system comprises: a radial core mechanical support system to support the reactor core in a radial direction; and an axial core mechanical support system to support the reactor core in an axial direction.

Example 9. The nuclear reactor of Example 8, further comprising: a radial reflector disposed within the canister; and a support beam disposed between an inner wall of the canister and the radial reflector, wherein the support beam is disposed axially along the length of the reactor core; wherein the radial core mechanical support system comprises a radial support bracket configured to interface with the support beam.

Example 10. The nuclear reactor of Example 9, wherein the radial support bracket comprises: a housing; a spring disposed internally within the housing; a shaft slidingly disposed within the housing and to engage the spring to compress and decompress the spring as the shaft travels in and out of the housing, the shaft further comprising an inset configured to interface with the support beam; a shaft travel pin to control the travel of the shaft; and a flange to mount the support bracket to the canister.

Example 11. The nuclear reactor of any one or more of Examples 8-10, further comprising a plate disposed on each end of the reactor core, wherein the axial core mechanical support system is configured to interface with the plate.

Example 12. The nuclear reactor of Example 11, wherein the axial core mechanical support system comprises: a housing; a spring disposed internally within the housing; a shaft slidingly disposed within the housing and to engage the spring to compress and decompress the spring as the shaft travels in and out of the housing, the shaft further comprising a shaft configured to interface with the plate; a shaft travel pin to control the travel of the shaft; and a flange to mount the support bracket to the canister.

Example 13. The nuclear reactor of Example 12, wherein the shaft comprises an inset configured to engages the plate.

Example 14. The nuclear reactor of any one or more of Examples 8-13, wherein the radial core mechanical support system and the axial core mechanical support system are configured to support the reactor core in an axial direction provide a preload force in a range of forces corresponding from 1 g to 10 g acceleration.

Example 15. A nuclear reactor, comprising: a reactor core; a canister to contain and seal the reactor core within the canister; and a core mechanical support system configured to mount to the canister, wherein the core mechanical support system comprises: a radial core mechanical support system to support the reactor core in a radial direction; and an axial core mechanical support system to support the reactor core in an axial direction; a radial reflector disposed within the canister; a support beam disposed between an inner wall of the canister and the radial reflector, wherein the support beam is disposed axially along the length of the reactor core, wherein the radial core mechanical support system comprises a radial support bracket configured to interface with the support beam; a plate disposed on each end of the reactor core, wherein the axial core mechanical support system is configured to interface with the plate; wherein the radial support bracket and the axial support bracket each comprises: a housing; a spring disposed internally within the housing; a shaft slidingly disposed within the housing and to engage the spring to compress and decompress the spring as the shaft travels in and out of the housing, the shaft further comprising an inset configured to interface with the support beam or the plate; a shaft travel pin to control the travel of the shaft; and a flange to mount the support bracket to the canister.

Example 16. The nuclear reactor of Example 15, wherein the shaft comprises an inset configured to engages the support beam or the plate.

Example 17. The nuclear reactor of any one or more of Examples 15-16, wherein the radial core mechanical support system and the axial core mechanical support system are configured to support the reactor core in an axial direction provide a preload force in a range of forces corresponding from 1 g to 10 g acceleration.

Numerous specific details are set forth to provide a thorough understanding of the overall structure, function, manufacture, and use of the aspects as described in the present disclosure and illustrated in the accompanying drawings. Well-known operations, components, and elements have not been described in detail so as not to obscure the aspects described in the present disclosure. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the present disclosure, like reference characters designate like or corresponding parts throughout the several views of the drawings.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various examples and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the example aspects may be made without departing from the scope of the invention. In addition, persons skilled in the art will recognize, or be able to ascertain using no more than routine experimentation, many equivalents to the various aspects of the invention described herein upon review of the present disclosure. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the present disclosure are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In the present disclosure, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in the present disclosure is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

Any patent application, patent, non-patent publication, or other disclosure material referred to in the present disclosure and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A nuclear reactor, comprising:
    a reactor core;
    a canister to contain and seal the reactor core within the canister;
    a radial reflector disposed within the canister;
    a support beam disposed between an inner wall of the canister and the radial reflector, wherein the support beam extends axially along a length of the reactor core; and
    a core mechanical support system configured to mount to the canister, wherein the core mechanical support system comprises:
        an axial core mechanical support system to support the reactor core in an axial direction; and
        a radial core mechanical support system to support the reactor core in a radial direction, wherein the radial core mechanical support system comprises a radial support bracket configured to interface with the support beam, and wherein the radial support bracket comprises:
            a housing;
            a spring disposed internally within the housing;
            a shaft slidingly disposed at least partially within the housing and to engage the spring to compress and decompress the spring as at least a portion of the shaft travels in and out of the housing, the shaft further comprising an inset configured to interface with the support beam;
            a shaft travel pin to control the travel of the shaft; and
            a flange to mount the radial support bracket to the canister.

2. The nuclear reactor of claim 1, further comprising a plate disposed on each end of the reactor core, wherein the axial core mechanical support system is configured to interface with the plate.

3. The nuclear reactor of claim 2, wherein the axial core mechanical support system comprises an axial support bracket comprising:
    a housing;
    a spring disposed internally within the housing;
    a shaft slidingly disposed at least partially within the housing and to engage the spring to compress and decompress the spring as a least a portion of the shaft travels in and out of the housing, the shaft further comprising an inset configured to interface with the plate;
    a shaft travel pin to control the travel of the shaft; and
    a flange to mount the axial support bracket to the canister.

4. The nuclear reactor of claim 1, wherein the radial core mechanical support system and the axial core mechanical support system are configured to support the reactor core in an axial direction to provide a preload force in a range of forces corresponding from 1 g to 10 g acceleration.

5. The nuclear reactor of claim 1, wherein the spring is a disc spring comprising a disc washer spring.

6. The nuclear reactor of claim 1, wherein the spring comprises a plurality of disc springs, wherein each of the plurality of disc springs comprises a plurality of stacked disc washer springs.

7. A nuclear microreactor, comprising:
    a reactor core;
    a canister to contain and seal the reactor core within the canister; and
    a core mechanical support system configured to mount to the canister, wherein the core mechanical support system comprises:
        a radial core mechanical support system to support the reactor core in a radial direction; and
        an axial core mechanical support system to support the reactor core in an axial direction;
    a radial reflector disposed within the canister;
    a support beam disposed between an inner wall of the canister and the radial reflector, wherein the support beam extends axially along a length of the reactor core, wherein the radial core mechanical support system comprises a radial support bracket configured to interface with the support beam;
    a plate disposed on each end of the reactor core, wherein the axial core mechanical support system is comprises an axial support bracket configured to interface with the plate;
    wherein the radial support bracket and the axial support bracket each comprises:
        a housing;
        a spring disposed internally within the housing;
        a shaft slidingly disposed at least partially within the housing and to engage the spring to compress and decompress the spring as at least a portion of the shaft travels in and out of the housing, the shaft further comprising an inset configured to interface with the support beam or the plate;
        a shaft travel pin to control the travel of the shaft; and
        a flange to mount the support bracket to the canister.

8. The nuclear microreactor of claim 7, wherein the radial core mechanical support system and the axial core mechanical support system are configured to support the reactor core in an axial direction to provide a preload force in a range of forces corresponding from 1 g to 10 g acceleration.

9. The nuclear microreactor of claim 7, wherein the spring is a disc spring comprising a disc washer spring.

10. The nuclear microreactor of claim 7, wherein the spring comprises a plurality of disc springs, wherein each of the plurality of disc springs comprises a plurality of stacked disc washer springs.

* * * * *